3,254,126
PURIFICATION OF HEXAMETHYLENEDIAMINE
David C. Griffith and Roy E. Jones, Pensacola, Fla., and Robert L. Rose, Decatur, Ala., assignors to Monsanto Company, St. Louis, Mo., a corporation of Delaware
No Drawing. Filed May 12, 1965, Ser. No. 455,342
5 Claims. (Cl. 260—583)

This application is a continuation-in-part of application Serial No. 233,147, filed October 25, 1962, now abandoned.

This invention relates to purifying hexamethylenediamine. More particularly it relates to a process for removing 1,2-diaminocyclohexane from crude hexamethylenediamine.

It is well known in the art to which this application pertains that hexamethylenediamine is a prime intermediate in the manufacture of some polyamides. It is equally well known that impurities resulting from the commercial manufacture of crude hexamethylenediamine must be removed effectively and economically from the hexamethylenediamine in order to obtain a refined product suitable for manufacturing high quality polyamides. Crude hexamethylenediamine obtained by catalytically hydrogenating adiponitrile in the presence of ammonia contains small quantities of ammonia, adiponitrile, propionitrile, and 1,2-diaminocyclohexane.

In previous practice, 1,2-diaminocyclohexane has been removed by fractional distillation. Because of the proximity of the boiling points of hexamethylenediamine and 1,2-diaminocyclohexane, a distillation process employed to separate these compounds has to be capable of separating constituents whose volatilities are of the same order of magnitude. Distillation processes that meet this requirement are extremely expensive to operate.

An object of the present invention, therefore, is to provide a process for purifying hexamethylenediamine.

Another object of the invention is to provide a process for removing 1,2-diaminocyclohexane from hexamethylenediamine.

A still further object of this invention is to provide an improved polyamide intermediate and a process for preparing the same.

Other objects of this invention will be apparent from the description of the invention hereinafter.

In accordance with this invention, it has been discovered that 1,2-diaminocyclohexane can be removed from crude hexamethylenediamine obtained by catalytically hydrogenating adiponitrile in the presence of ammonia by contacting such crude hexamethylenediamine with an aqueous solution of at least one compound selected from the group consisting of copper sulfate and nickel sulfate. An insoluble chelate is thus precipitated. This insoluble precipitate can then be separated by well known liquid-solid separation methods.

In practicing the instant invention, an aqueous solution of copper sulfate, nickel sulfate, or a mixture thereof is added to crude liquid hexamethylenediamine obtained from catalytically hydrogenating adiponitrile in the presence of ammonia. The resulting mixture is thoroughly agitated for a period of time sufficient in length to insure thorough contact between the metal of the copper sulfate, nickel sulfate, or a mixture thereof and any 1,2-diaminocyclohexane contained in the crude hexamethylenediamine. After allowing a sufficient period of time to insure that substantial completion of the chelation reaction has been obtained, the solid, precipitated chelate is then removed by distillation, filtration, centrifugation and decantation, or other like liquid-solid separating means.

As the reaction takes place a certain quantity of metal (copper or nickel) will combine with a chemically proportional amount of 1,2-diaminocyclohexane. That is, stoichiometrically 1 mol of copper or nickel will react with 2 mols of 1,2-diaminocyclohexane; thus if a stoichiometrically equivalent amount of copper sulfate, nickel sulfate, or a mixture thereof is added to the crude hexamethylenediamine then, theoretically, substantially all of the 1,2-diaminocyclohexane will be removed. It follows, again theoretically, that if less than a stoichiometric amount of copper sulfate, nickel sulfate, or a mixture thereof is employed, a correspondingly smaller amount of 1,2-diaminocyclohexane will be removed. Therefore, it is obvious that to obtain complete removal of all the 1,2-diaminocyclohexane in crude hexamethylenediamine it is necessary that at least 1 mol of copper or nickel, as copper sulfate or nickel sulfate, be added to the crude hexamethylenediamine for each 2 mols of 1,2-diaminocyclohexane. Generally, in practice, a small stoichiometric excess of copper sulfate, nickel sulfate, or a mixture thereof is employed, i.e., a mol ratio of metal (copper or nickel) to 1,2-diaminocyclohexane of greater than 0.5 is advantageously employed. In actual practice it is not possible to remove all 1,2-diaminocyclohexane in crude hexamethylenediamine, but copper sulfate and nickel sulfate remove by far the greatest quantity of 1,2-diaminocyclohexane when compared with other chelate forming, metallic cation compounds.

The temperature of the mixture of the aqueous copper sulfate solution and the crude liquid hexamethylenediamine during reaction and/or distillation may be maintained at any level between the atmospheric pressure melting point of hexamethylenediamine or the lower solubility temperature limit of the mixture, if any, and the atmospheric pressure boiling point of hexamethylenediamine or decomposition temperature of the insoluble chelate depending upon which upper and lower temperature limits provide the narrowest range. If pressure is applied to the mixture for any reason, the temperature of the mixture may be varied accordingly within the above temperature limits in a manner well known to those skilled in the art. For filtration and/or decantation techniques the optimum temperature range is limited to 50–60° C. to reduce chelate solubility to a minimum.

The invention is further illustrated by the following specific examples. These examples are not intended to limit the invention in any manner whatsoever.

EXAMPLE I

Two hundred and four (204) grams of crude hexamethylenediamine containing 1135 mols of 1,2-diaminocyclohexane per million mols of hexamethylenediamine were placed in a 500–ml. round bottom, three-necked distillation flask into which a thermometer and a sparger tube were fitted. A 6-inch Vigreux column with distillation head and thermometer was attached to the center opening of the distillation flask and a hot water condenser was used to condense the overhead distillate stream from the distillation column. Water and free ammonia were removed from the crude hexamethylenediamine by distilling it at an absolute pressure of 70 mm. mercury, a pot temperature of 90° C., and a distillation head temperature of 44° C. After the water had been removed, the pressure which was controlled by a water aspirator needle valve system was increased to atmospheric, and 6.5 ml. of an aqueous solution of cupric sulfate ($CuSO_4 \cdot 5H_2O$), equivalent to 0.332 gram of copper, was added to the pot. The mixture was agitated vigorously with nitrogen through the sparger tube for 10 minutes while the temperature of the mixture was maintained at 90° C. The mol ratio of the copper added to the 1,2-diaminocyclohexane was 2.5, and the resulting mixture in the flask contained approximately 3 percent water. Following the agitation, the hexamethylenediamine was distilled using an average distillation head temperature of 125° C., pot temperature of 129° C., and an average absolute pressure of 66 mm. mercury maintained on the column. After distillation of approximately 90 percent of the hexamethylenediamine, the distillate was analyzed and found to contain 20 mols of 1,2-diaminocyclohexane per million mols of hexamethylenediamine and no copper.

EXAMPLE II

One hundred ninety-four and three-tenths (194.3) grams of hexamethylenediamine containing 1275 mols of 1,2-diaminocyclohexane per million mols of hexamethylenediamine were added to the pot of the apparatus of Example I, and the ammonia present was stripped therefrom under reduced pressure. Following this, 4.5 ml. of an aqueous solution of cupric sulfate ($CuSO_4 \cdot 5H_2O$) solution representing a mol ratio of copper to 1,2-diaminocyclohexane of 1.7 was added to the stripped hexamethylenediamine and the mixture was agitated for several minutes. Distillation was effected at 70 mm. mercury absolute pressure and an average distillation head temperature of 125° C. The analysis of the distillate showed 119 mols of 1,2-diaminocyclohexane per million mols of hexamethylenediamine and the presence of no copper.

EXAMPLE III

Two hundred fifty (250) grams of crude hexamethylenediamine containing 765 mols of 1,2-diaminocyclohexane per million mols of hexamethylenediamine were added to the pot of the apparatus of Example I in which the 6-inch Vigreux column had been replaced by a 24-inch vacuum jacketed, Helio grid packed column having approximately 20 theoretical plates. Following the stripping of the free ammonia under reduced pressure, 4.8 ml. of an aqueous cupric sulfate ($CuSO_4 \cdot 5H_2O$) solution which was equivalent to 0.9 gram of copper and gave a mol ratio of copper to 1,2-diaminocyclohexane of 8.4 was added to the pot and the mixture was agitated several minutes. Distillation of the mixture was carried out at 70 mm. mercury absolute pressure and a distillation head temperature averaging 125° C. After distillation of more than 99 percent of the hexamethylenediamine, the analysis of the distillate showed 165 mols of 1,2-diaminocyclohexane per million mols of hexamethylenediamine and no copper present.

EXAMPLE IV

One hundred (100) grams of crude hexamethylenediamine containing 1090 mols of 1,2-diaminocyclohexane per million mols of hexamethylenediamine were added to the pot of the apparatus of Example III. Following the stripping of the free ammonia under reduced pressure, 4.0 ml. of an aqueous nickel chloride ($NiCl_2 \cdot 6H_2O$) solution, which gave a mol ratio of nickel to 1,2-diaminocyclohexane of 2.0, was added to the pot and the mixture was agitated several minutes. Distillation of the mixture was carried out at 75 mm. mercury absolute pressure and a distillation head temperature averaging 135° C. After distillation of more than 80 percent of the hexamethylenediamine, the analysis of the distillate showed 700 mols of 1,2-diaminocyclohexane per million mols of hexamethylenediamine and no nickel present.

EXAMPLE V

One hundred (100) grams of crude hexamethylenediamine containing 1205 mols of 1,2-diaminocyclohexane per million mols of hexamethylenediamine were added to the pot of the apparatus of Example III. Following the stripping of the free ammonia under reduced pressure, an aqueous cobaltous sulfate solution, which gave a mol ratio of cobalt to 1,2-diaminocyclohexane of 2.0, was added to the pot and the mixture was agitated several minutes. Distillation of the mixture was carried out at 75 mm. mercury absolute pressure and a distillation head temperature averaging 135° C. After distillation of more than 80 percent of the hexamethylenediamine the analysis of the distillate showed 969 mols of 1,2-diaminocyclohexane per million mols of hexamethylenediamine and no cobalt present.

EXAMPLE VI

To a sample of crude hexamethylenediamine containing 1094 mols of 1,2-diaminocyclohexane per million mols of hexamethylenediamine, 4.8 ml. of an aqueous solution of cupric sulfate ($CuSO_4 \cdot 5H_2O$) were added to give a mol ratio of copper to 1,2-diaminocyclohexane of 1.0. The mixture was stirred for 10 minutes while being held at 160° C. Following the agitation, the hot mixture was filtered through a medium porosity sintered glass filter funnel on which a ⅛-inch Celite filter bed had been placed, with the hexamethylenediamine blanketed with nitrogen during the filtration to prevent carbonate formation. Vacuum was used as a filtering aid. The analysis of the filtrate showed 110 mols of 1,2-diaminocyclohexane per million mols of hexamethylenediamine and 2.1 p.p.m. copper.

EXAMPLE VII

To a sample of crude hexamethylendiamine containing 1094 mols of 1,2-diaminocyclohexane per million mols of hexamethylenediamine, 2.4 ml. of an aqueous solution of cupric sulfate ($CuSO_4 \cdot 5H_2O$) were added to give a mol ratio of copper to 1,2-diaminocyclohexane of 0.5. The mixture was stirred for 20 minutes while being held at 160° C. and following the agitation, the hot mixture was filtered through a medium porosity sintered glass filter funnel on which a ⅛-inch Celite filter bed had been placed with the hexamethylenediamine blanketed with nitrogen during the filtration to prevent carbonate formation. Vacuum was used as a filtering aid and the analysis of the filtrate showed 400 mols of 1,2-diaminocyclohexane per million mols of hexamethylenediamine.

EXAMPLE VIII

To a sample of crude hexamethylenediamine containing 1110 mols of 1,2-diaminocyclohexane per million mols of hexamethylenediamine a sufficient volume of an aqueous cupric sulfate ($CuSO_4 \cdot 5H_2O$) solution was added to give a copper to 1,2-diaminocyclohexane mol ratio of 0.5. The mixture was stirred for 10 minutes while the temperature thereof was held at 75° C., and the resulting precipitate was separated by centrifuging at 2000 r.p.m. for 15 minutes. The supernatant was decanted and an analysis thereof showed 31 mols of 1,2-diaminocyclohexane per million mols of hexamethylenediamine and 2.2 p.p.m. copper.

EXAMPLE IX

A 100 gram sample of crude hexamethylenediamine containing 1100 mols of 1,2-diaminocyclohexane per million mols of hexamethylenediamine was provided. Four (4) ml. of 0.11 gram of cobaltous chloride per ml. of aqueous solution were added to the crude hexamethylenediamine sample. This addition produced a cobalt to 1,2-diaminocyclohexane mol ratio of about 2. The resulting precipitate was then removed by distilling the hexamethylenediamine overhead at 130–133° C. The distillate was found to contain 1023 mols of 1,2-diaminocyclohexane per million mols of hexamethylenediamine.

EXAMPLE X

From the aforegoing experiments and from other test work performed, it was seen that copper sulfate and nickel sulfate were markedly superior for removing 1,2-diaminocyclohexane from crude hexamethylenediamine. To further investigate this apparent nickel sulfate and copper sulfate superiority these compounds were comparatively tested with an extensive variety of other compounds that precipitate metallic chelates with varying degrees of effectiveness.

Each test was performed in identical fashion. One hundred milliliters of crude hexamethylenediamine containing 615 mols of 1,2-diaminocyclohexane per million mols of hexamethylenediamine were used as a test sample for each test. The concentration of the aqueous solution of each compound was so adjusted that in each test sufficient water was added to the crude hexamethylenediamine to adjust the water concentration thereof to an identical percentage, 8.4% by weight. Enough of each compound was added to each 100 milliliter sample to produce a mol ratio of metal to 1,2-diaminocyclohexane slightly in excess of 0.5. In each test the sample was centrifuged to remove the precipitate, if any, and the supernatant liquor was then analyzed for 1,2-diaminocyclohexane. The results of the tests are tabulated in Table 1 below.

Table 1

COMPARATIVE TEST RESULTS

| Metallic Compounds | 1,2-diaminocyclohexane in supernatant liquor; mols of 1,2-diaminocyclohexane per million mols of hexamethylenediamine |
|---|---|
| Cobaltic Sulfate, $CO_2(SO_4)_3$ | 257 |
| Nickelous Sulfate, $NiSO_4 \cdot 6H_2O$ | 74 |
| Cupric Acetate, $Cu(C_2H_3O_2)_2$ | 288 |
| Chromic Acetate, $Cr(C_2H_3O_2)_3 \cdot H_2O$ | No Precipitate |
| Zinc Sulfate, $ZnSO_4 \cdot 7H_2O$ | 498 |
| Nickelous Chloride, $NiCl_2 \cdot 6H_2O$ | 514 |
| Potassium Chloroplatinate, $K_2PtCl_4$ | 179 |
| Cupric Sulfate, $CuSO_4 \cdot 5H_2O$ | 86 |
| Cupric Sulfate, $CuSO_4 \cdot 5H_2O$ | 90 |
| Cupric Chloride, $CuCl_2$ | 498 |
| Ferrous Sulfate, $FeSO_4 \cdot 7H_2O$ | 199 |
| Silver Sulfate, $Ag_2SO_4$ | 561 |
| Cupric Oxalate, $CuC_2O_4$ | 257 |
| Cupric Salicylate, $Cu(C_7H_5O_3)_2 \cdot 4H_2O$ | 467 |
| Cupric Iodate, $Cu(IO_3)_2 \cdot H_2O$ | 534 |
| Cupric Ferrocyanide, $Cu_2Fe(CN)_6 \cdot 7H_2O$ | 506 |
| Cupric Chromate, $CuCrO_4$ | 561 |
| Cupric Meta Vanadate, $CuVO_3$ | 319 |
| Cupric Fluoride, $CuF_2 \cdot 2H_2O$ | 421 |
| Chromic Sulfate, $Cr(SO_4)_3 \cdot 5H_2O$ | 600 |

EXAMPLE XI

To investigate various variables other than the compounds themselves, a series of tests employing nickelous sulfate as the 1,2-diaminocyclohexane precipitating compound were performed. In certain of the tests stoichiometric amounts of nickel as nickelous sulfate were added to 100 milliliter samples, i.e., amounts stoichiometrically equivalent to the quantity of 1,2-diaminocyclohexane. In other tests varying excess amounts of nickel were employed. Also, the water content of the samples was varied. The initial crude hexamethylenediamine used in each test was the same as that described in Example X, i.e., each sample contained 615 mols of 1,2-diaminocyclohexane per million mols of hexamethylenediamine.

Table 2

COMPARATIVE NICKEL TESTS

| Sample | Mol ratio of nickel to 1,2-diaminocyclohexane | Percent $H_2O$ | Mols of 1,2-diaminocyclohexane per million mols of hexamethylenediamine |
|---|---|---|---|
| 1 | 0.50 | 4.4 | 113 |
| 2 | 0.50 | 8.4 | 108 |
| 3 | 0.75 | 4.4 | 85 |
| 4 | 0.75 | 8.4 | 90 |
| 5 | 1.0 | 4.4 | 74 |
| 6 | 1.0 | 8.4 | 90 |

From the above it can be seen that at stoichiometric quantities of nickel to 1,2-diaminocyclohexane (mol ratio of 0.5) the 1,2-diaminocyclohexane removal efficiency was not quite as good as that obtained when an excess quantity was employed, that is, 0.75 and 1.0 mol ratio of nickel to 1,2-diaminocyclohexane. The quantity of water employed was changed from 8.4 to 4.4 percent in certain of the tests. There was no appreciable change noted from doing so.

From the above examples it is clear without dispute that nickel sulfate and copper sulfate are vastly superior to other like compounds for use as chelating compounds to remove 1,2-diaminocyclohexane from crude hexamethylenediamine. The primary advantage of this process is clear, i.e., a deleterious impurity present in a commercially desirable chemical (hexamethylenediamine) can be quickly and economically removed by using reasonably inexpensive copper sulfate and nickel sulfate in conjunction with customary liquid-solid separation methods. This process, because of its simplicity and high degree of effectiveness, is markedly superior to any and all procedures heretofore employed to achieve the same results.

Although the invention has been described by reference to specific procedures, compounds, and the like, it must be clearly understood that the invention is to be only limited to the scope of the appended claims.

What is claimed is:

1. A process for removing 1,2-diaminocyclohexane from crude hexamethylenediamine comprising, in combination:
    (a) precipitating an insoluble chelate from said crude hexamethylenediamine by contacting an aqueous solution of at least one member selected from the metal containing group of compounds consisting of nickel sulfate and copper sulfate with said crude hexamethylenediamine; and
    (b) separating said insoluble chelate from said crude hexamethylenediamine.

2. A process for removing 1,2-diaminocyclohexane from crude hexamethylenediamine comprising, in combination:
    (a) precipitating an insoluble chelate from said crude hexamethylenediamine by contacting a sufficient amount of an aqueous solution of at least one member selected from the metal containing group of compounds consisting of copper sulfate and nickel sulfate to provide a metal to 1,2-diaminocyclohexane mol ratio of at least 0.5; and
    (b) separating said insoluble chelate from said crude hexamethylenediamine.

3. The process of claim 2 wherein the mol ratio of metal to 1,2-diaminocyclohexane is greater than 0.5.

4. A process for removing 1,2-diaminocyclohexane from crude hexamethylenediamine comprising, in combination:
    (a) precipitating an insoluble chelate from said crude hexamethylenediamine by contacting an aqueous solution of copper sulfate with said crude hexamethylenediamine; and
    (b) separating said insoluble chelate from said crude hexamethylenediamine.

5. A process for removing 1,2-diaminocyclohexane from crude hexamethylenediamine comprising, in combination:
    (a) precipitating an insoluble chelate from said crude hexamethylenediamine by contacting an aqueous solution of nickel sulfate with said crude hexamethylenediamine; and
    (b) separating said insoluble chelate from said crude hexamethylenediamine.

No references cited.

CHARLES B. PARKER, *Primary Examiner.*